United States Patent [19]
Shneider

[11] 3,735,615
[45] May 29, 1973

[54] METHOD OF MAKING GROOVES ON SURFACE OF ARTICLES AND DEVICE FOR ITS REALIZATION

[76] Inventor: Jury Gdalievich Shneider, prospekt Stachek, 134, kv. 19, Leningrad, U.S.S.R.

[22] Filed: May 19, 1970

[21] Appl. No.: 38,739

[52] U.S. Cl............................................72/75, 72/80
[51] Int. Cl. .............................................B44b 5/00
[58] Field of Search......................72/73, 74, 75, 80, 72/81, 406; 29/90, 90.5; 101/5, 6, 7, 8, 22, 23; 33/18, 21, 26, 27

[56] References Cited

UNITED STATES PATENTS

| | | | |
|---|---|---|---|
| 2,247,887 | 7/1941 | Nascimbeni | 29/90 |
| 2,706,930 | 4/1955 | Jansen | 33/18 |
| 2,977,681 | 4/1961 | Cadman et al. | 33/21 |
| 887,553 | 5/1908 | Wadsworth | 33/21 |
| 3,220,087 | 11/1965 | Schwarz | 29/90 |
| 629,245 | 7/1899 | Frank | 72/75 |
| 1,794,797 | 3/1931 | Rockwell | 72/75 |
| 2,048,598 | 7/1936 | Christiansen | 72/75 |

Primary Examiner—Lowell A. Larson
Attorney—Holman & Stern

[57] ABSTRACT

The machining of the surfaces of articles for making grooves intended to retain liquid or gaseous media used for lubrication or as an interlayer to the devices for the realization of these methods, and to the articles machined by these methods.

Most successfully the invention can be used in machining the surfaces of cylinder liners, pistons and the walls of the holes in the pistons for the piston pins in internal combustion engines and in machining sliding and rolling contact bearings, spinning machine rings, and gauge blocks.

No less successfully this invention can be used for machining the reflectors of heating appliances, fountain pen caps, various vessels and articles of jewelry, because the network of grooves forms an attractive ornamental pattern.

The method consists in forcing at least one spring-loaded spherical deforming member into the surface layer of the article. The machined surface of the article and the deforming member move at an angle to each other and the motion of at least one of them is either reciprocating or rotary.

In the various forms of the device, the deforming member is mounted in a holder which reciprocates and moves progressively with relation to the rotating article holder or rotates with relation to the progressively moving article holder.

11 Claims, 34 Drawing Figures

METHOD OF MAKING GROOVES ON SURFACE OF ARTICLES AND DEVICE FOR ITS REALIZATION

BACKGROUND OF THE INVENTION

The present invention relates to the methods of machining the surfaces of articles for making grooves on them, said grooves being intended to retain liquid or gaseous media used as a lubricant or an interlayer, or to trap wear-causing particles, and it relates also to the devices for the realization of these methods and to the articles grooved by these methods.

Most successfully the method according to the invention can be used in machining the surfaces of cylinder liners, pistons and holes in the pistons for the piston pins in internal-combustion engines, sliding and rolling contact bearings, rings of spinning machines, and gauge blocks.

No less successfully this method can be used for machining the reflectors of heating appliances, fountain pen caps, various vessels, and articles of jewelry, since the system of grooves produces an attractive decorative pattern.

It is known that the highest resistance to wear is offered by parts having a relatively large bearing surface which retains well a lubricating medium. The known methods of surface machining allow the bearing surface to be increased by reducing its roughness. This purpose is achieved by, for example, grinding, honing and finishing. However, the surface of the particle with a smaller roughness is not so efficient in retaining the lubricating medium.

Also known in the art are machining methods according to which individual grooves are made on the surface of the rubbing parts by cutting or pressing; however, in view of the fact that a relatively small number of these grooves are generally formed, and are isolated from each other, the lubricating medium fails to be distributed uniformly over the entire friction surface and cannot flow from one groove into another.

An object of the present invention is to eliminate the aforesaid disadvantages.

SUMMARY OF THE INVENTION

The main object of the invention is to provide a highly-productive method of grooving the surfaces of articles which may or may not comprise bodies of revolution which ensures, respectively, a rotary or rectilinear motion of the article and such a motion of the tool which is transverse to the motion of the article, with the tool being forced into the surface layer of the article without losing the resilient contact with said layer, as a result of which the surface of the article is covered with a network of either intersected or non interesected grooves which cover said surface either uniformly, or with a required degree of nonuniformity. Additionally, the inventive method includes a provision for varying the density of the network of grooves and its pattern within broad limits. This object is accomplished by providing a method of grooving the surfaces of articles in which at least one spring-loaded spherical deforming member is forced into the surface layer of the article wherein, according to the invention, the part of the article being machined and the deforming member move at an angle to each other and the motion of at least one of them is either reciprocating or rotary. As a result of this motion the surface of the article is covered rather rapidly with a network of grooves.

For grooving the curvilinear surface of articles which are bodies of revolution by forcing a spherical deforming member into the surface layer of such a rotating article it is practicable that to this member be imparted simultaneously two kinds of motion, the first of which is progressive and parallel to the rotational axis of the article being machined, whereas the second motion is selected from the following types: vibratory along the first motion; vibratory around the axis which is perpendicular to, and intersecting, the direction of the first motion; rotary around the axis perpendicular to, and intersecting, the direction of the first motion. The speed of the first motion must be sufficiently high so as to ensure intervals between the adjacent parallel sections of adjacent grooves.

As a result, the direction of motion of the deforming member will be at an angle to the direction of motion of the machined parts of the article.

The method according to the invention can be even more effective if concurrently with the second motion (rotary around the axis which is perpendicular to, and intersecting, the first motion) the deforming member reciprocates along the first motion, i.e. makes a third motion.

The face ends of articles which are bodies of revolution can be grooved by imparting simultaneously two motions to the deforming member, with the first motion being progressive, perpendicular to, and intersecting, the rotational axis of the machined article, and the second motion being a reciprocating motion directed along the first motion.

The surfaces of articles which are not bodies of revolution are grooved by imparting simultaneously two motions to the deforming member, the first one being a rotary motion around a fixed axis which is perpendicular to the direction of the rectilinear progressive motion of the article, while the second one is a reciprocating motion along the radius drawn from said fixed axis towards the point of penetration of the deforming member into the surface layer of the article.

A device for grooving curvilinear surfaces of articles which are bodies of revolution comprises a holder for the article being machined, connected with a drive which rotates said holder; a base mounting a holder for the spring-loaded spherical deforming member, said holder also being connected to a drive which moves it progressively along the rotational axis of the article holder; and a drive for the holder of the deforming member mounted on the base and reciprocating said holder along the direction of motion of said base.

For grooving the face surfaces of articles which are not bodies of revolution, the device is designed in the main as described above, except for the base which moves progressively not along the rotational axis of the article holder, but across it.

Such a design of the device makes it possible to machine the external curvilinear surfaces of solid bodies of revolution, the external and internal surfaces of hollow bodies of revolution, as well as the faces of these bodies.

For grooving the surfaces of articles which are not bodies of revolution, the device according to the invention comprises an article holder connected to a drive which imparts rectilinear progressive motion to said holder; a base which mounts the holder of at least one spring-loaded spherical deforming member, said base being connected with a drive which imparts to said base a rotary motion around the axis which is perpendicular to the direction of motion of the article holder, whereas the drive of the holder of the deforming member is mounted on the base and imparts to said holder a reciprocating motion along the radius of the circumference around which the base moves, with said radius intersecting the deforming member.

The device for grooving the external surfaces of relatively long cylindrical articles, according to the invention, comprises three spring-loaded spherical deforming members mounted on the inner side of their holder, with the latter being made in the form of a bushing. The deforming member is reciprocated by its holder drive along its longitudinal axis. The device further comprises a means for rotating and displacing the rotating article through the holder of the deforming members.

As a result of machining by the above-listed versions of the method according to the invention, the surface of the article is characterized in that it becomes covered with a network of sinusoidal grooves. This network of grooves is achieved by a complex relative motion of the article and deforming member without breaking the resilient contact between them, and ensures uniform distribution of oil over the entire surface of the article if the latter serves as a rubbing part.

It must be understood that variations in the density of the network and in its pattern can be achieved comparatively easily, namely by changing the speed of the article displacement and/or the speed of motion of the deforming member.

Now the method of making grooves on the surfaces of articles and the devices for the realization of said method according to the invention will be described in detail with reference to the accompanying drawings, in which

DETAILED DESCRIPTION OF THE INVENTION

The method according to the invention provides for the use of a spring-loaded spherical deforming member 1 (FIGS. 1–4, the spring not being shown) made in the form of a hardened ball or a spherical diamond body soldered into a metal bar. According to the method, the deforming member is resiliently pressed against the surface of the article 2 being machined which is a body of revolution, and which is rotated around its longitudinal axis A—A in the direction of arrow B.

The deforming member 1 (FIG. 1) is imparted two motions simultaneously, one of which is progressive (along arrow S) and parallel to the axis A—A of rotation of the article 2 while the second one is a rotary motion (along arrow C) around axis O—O which is perpendicular to the direction of the first motion.

As a result of these two motions and of the force of the spring, the deforming member and the machined surface of the article do not lose the resilient contact therebetween and move at an angle to each other. The surface of the article becomes covered with a network of sinusoidal grooves intersecting one another and, consequently communicating with one another.

Another version of the method according to the invention provides also for the rotation of the article 2 around its longitudinal axis A—A (FIG. 2) in the direction of arrow B and for the progressive motion of the spring-loaded deforming member 1 along arrow S, said motion being parallel to the rotational axis A—A of the article, and for an additional reciprocating or oscillating motion of the deforming member 1 along arrows M around axis E—E which is perpendicular to, and intersecting, the direction of the first motion (along arrow S).

The reciprocating or oscillating motion is effected along the arc of the circle whose radius is marked r. In this case the surface of the rotating article also becomes covered with a network of sinusoidal grooves, intersecting one another.

Figure 1:
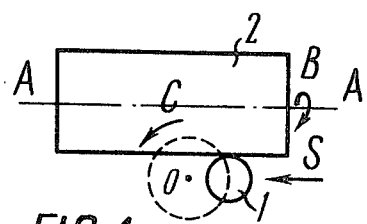
FIGS. 1 through 4 are elementary diagrams of motions of a deforming member while grooving the external cylindrical surface of articles which are bodies of revolution, and of the motions of said articles.
Figure 2:
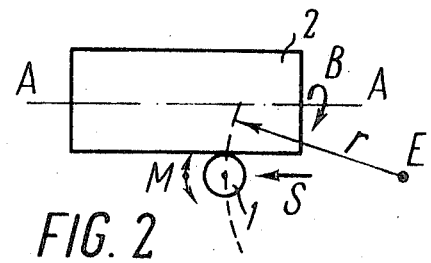
Figure 3:
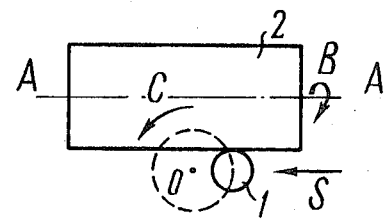

The next version of the method according to the invention, illustrated in FIG. 3, provides for imparting to the deforming member 1 simultaneously three motions relative to the rotating article 2. The first of these motions is progressive and parallel to the rotational axis A—A of the article (shown by arrow S); the second one is a linear reciprocating motion (shown by arrows N directed along or parallel to the first motion; and the third motion is a rotary motion around the axis O—O which is perpendicular to, and intersecting, the direction of the first motion; the direction of the third motion is shown by arrow C.

In still another version of the method according to the invention, the deforming member 1 (FIG. 4) is imparted simultaneously two motions, the first one being progressive (shown by arrow S) directed parallel to the rotational axis A—A of the article 2 whereas the second one is a reciprocating motion in the direction of or parallel to, the first motion. The second motion is indicated by arrows N.

In all the above described versions of the method according to the invention, the speed of the progressive motions of the deforming member 1, directed parallel to the rotational axis A—A of the article 2 should be sufficiently high so as to leave gaps between the adjacent parallel sections of the adjacent grooves.

Figure 4:
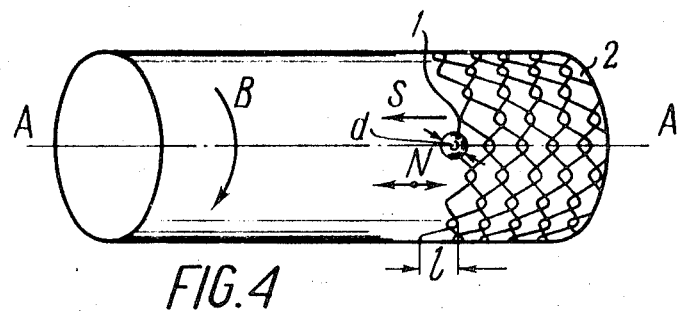
Figure 5:
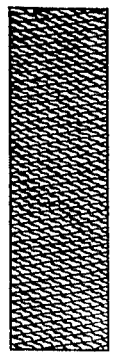
FIGS. 5 through 22 illustrate parts of the surface of the articles machined by the method shown in FIG. 4.
Figure 8:
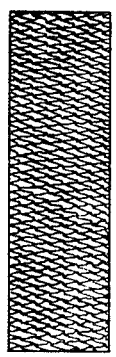
Figure 11:
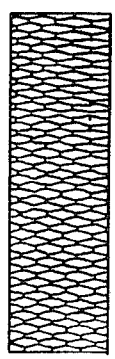
Figure 6:
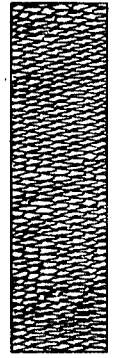
Figure 9:
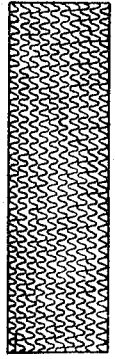
Figure 12:
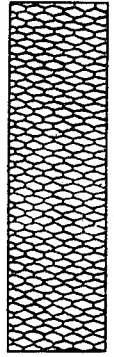
Figure 7:
Figure 10:
Figure 13:
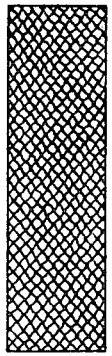
Figure 14:
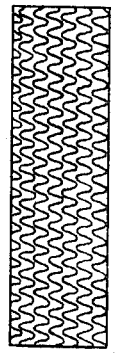
Figure 17:
Figure 20:
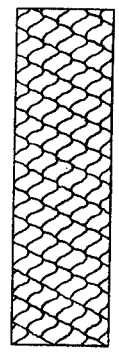
Figure 15:
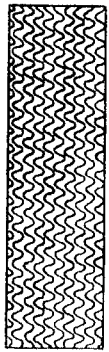
Figure 18:
Figure 21:
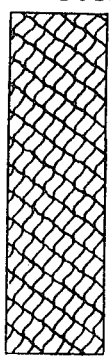
Figure 16:
Figure 19:
Figure 22:
Figure 25:
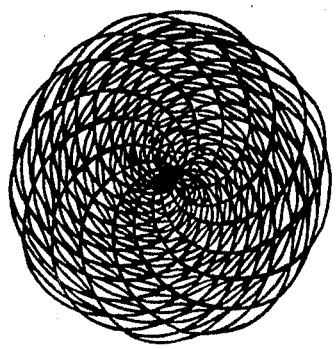
FIGS. 25 through 28 show parts of the surfaces of the articles machined by the method illustrated in FIG. 24.
Figure 28:
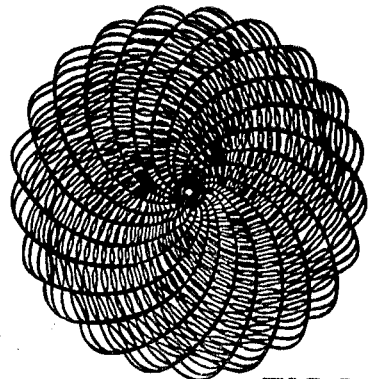
Figure 26:
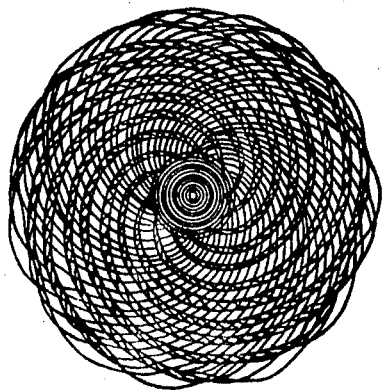
Figure 27:
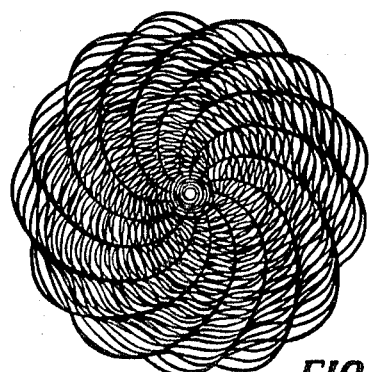

For example, for the version of the method illustrated in FIG. 4 this provision is satisfied if $$S > (p-l \sin \pi [i])$$

where $S$ = of the deforming member in the direction indicated by the same letter, mm/rev;

$p$ = value determined as $\sqrt{d/h}$ where $h$ = depth of penetration of the deforming member into the material of the blank;

$d$ = of the deforming member, mm;

$1$ = amplitude of deforming member vibrations when said member reciprocates along the direction shown by arrow N;

$i$ = value determined as $N/n$ where $N$ is the number of double strokes per minute in the directions indicated by the same letter, and $n$ is the rotational speed of the article, rpm.

The articles machined by the method whose versions are illustrated in FIGS. 1 through 4 have a network of sinusoidal grooves. The intervals between the parallel sections of the adjacent grooves can be varied by changing the vibration amplitude of the deforming member, the number of its double strokes per minute, the rotation speed of the article, the feed in the direction shown by arrow S, with all of these depending on the diameter of the article.

For example, in the version of the method illustrated in FIG. 4, the density of the network will grow with an increase in the vibration amplitude of the deforming member 1 and in the number of its double strokes, and with the reduction in the rotation speed of the article, in the feed of the deforming member directed parallel to the rotational axis A—A of the article 2, and in the diameter of the article.

By varying the rotation speed of the article alone it is possible to change substantially the mesh size of the network and its pattern, as can be seen in FIGS. 5 through 22 which illustrate different sections of the external surface of one and the same article which is a cylinder of a constant diameter throughout its length.

The internal surfaces of articles which are hollow cylinders or other hollow bodies of revolution are machined analogously to the machining of the external surfaces of the articles which are bodies of revolution. Thus, a version of machining the internal cylindrical surface of a hollow cylinder 3 (FIG. 23) is analogous to the method of machining the external cylindrical surface of a body of revolution illustrated in FIG. 4.

Figure 24:
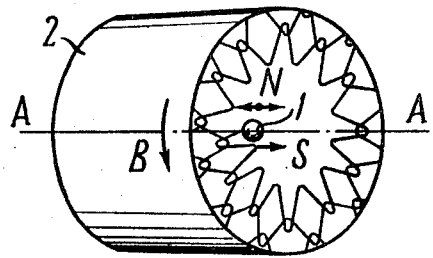
FIG. 24 is an elementary diagram of motions of the deforming member while machining a face surface of an article which is a body of revolution, and of the motion of said article.

For machining the face surfaces of articles 2 (FIG. 24) which are bodies of revolution, the deforming member 1 is imparted simultaneously two motions, the first one being progressive (shown by arrow S) and perpendicular to, and intersecting, the rotational axis A—A of the article 2, with the second one being a reciprocating motion (shown by arrows N) along or parallel to the first motion.

As a result of this machining, the face surface of the article becomes covered with a network of sinusoidal grooves. By changing the speeds of the above-mentioned motions the pattern and the size of mesh can be varied as shown in FIGS. 25 through 28.

The surfaces of articles 4 (FIG. 29) which are not bodies of revolution are machined by imparting to the article a progressive motion in the direction of arrow K and imparting to the deforming body 1 simultaneously two motions, the first one being a rotary motion (shown by arrow F) around a fixed axis P—P which is perpendicular to the direction of motion of the article, with the second one being a reciprocating motion along radius R drawn from the axis P—P to the point where the deforming member 1 is forced into the surface layer of the article 4.

As a result, the surface of the article semilarly becomes covered with a network of sinusoidal grooves.

The grooves made on the surfaces of articles by the method according to the invention form networks with an attractive pattern. This allows these articles to be used not only in the capacity of friction parts, but as decorative articles as well.

The version of the method illustrated in FIG. 4 can be realized by the device comprising a movable base 5 (FIG. 30) which carries a holder 6 for the deforming member 1. The holder is made in the form of a curved rod, one end of which is secured in a bushing 7 with a provision for turning around an axis 8. The end of the bushing 7 is connected with an eccentric 9 by means of a shackle 10 and a bolt 10a. The eccentric is rotated by an electric motor 11. The bushing 7 is accommodated in a hollow guide 12 which is connected rigidly with the base 5. To prevent the bushing 7 from turning around its longitudinal axis, the bushing is provided with an elongated port or slot 13 through which a screw 14 is passed, said screw being turned into a threaded hole in the wall of the guide 12. At the opposite side of the bushing 7, with relation to the article 2, there is a threaded hole, screwed into which is a sleeve 15 accommodating a spring 16, one end of which spring bears against the bottom of the sleeve while its other end bears against the holder 6 via a spindle 17. The outer end of the spindle 17 is located in a recess 18 made in the holder 6. The free end 19 of the holder 6 has a head with a socket 20 which houses a ball bearing 22 on an axle 21. The external surface of the head is threaded for screwing on a brass cap 23 with a tapered hole.

The spherical deforming member 1 installed between the bearing 22 and the cap 23 has the form of a hardened steel ball. Said ball is located in the above-noted tapered hole of the cap 23 and extends above said cap. The cap 23 is screwed on the head of the holder 6 so that the ball is free to rotate when it rubs against the external surface of the cylindrical article 2. For this purpose the cap 23 is secured by a lock nut 24. The article 2 is secured between the rotating clamps or centers 25 one of which is coupled to the drive (not shown in the drawing), said drive rotating this clamp and, consequently, the article and the other clamp or center.

The base 5 moves progressively with relation to the rotating article 2 and parallel to the rotational axis A—A of the article as shown by arrow S (the base drive and its guides are not shown). The deforming member is resiliently pressed against the external surface of the article 2 by means of the spring 16. Concurrently with the progressive motion, the deforming member 1 reciprocates (vibrates linearly) in the directions shown by arrows N. The latter motion is imparted to the deforming motion 1 by the eccentric 9 which is rotated by the electric motor 11.

Figure 23:
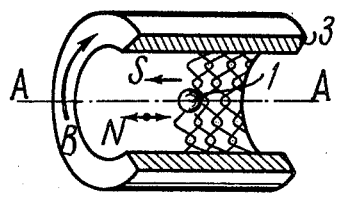
FIG. 23 is an elementary diagram of motions of the deforming member according to the invention while machining the internal cylindrical surface of a hollow article which is a body of revolution, and of the motion of said article.
Figure 31:
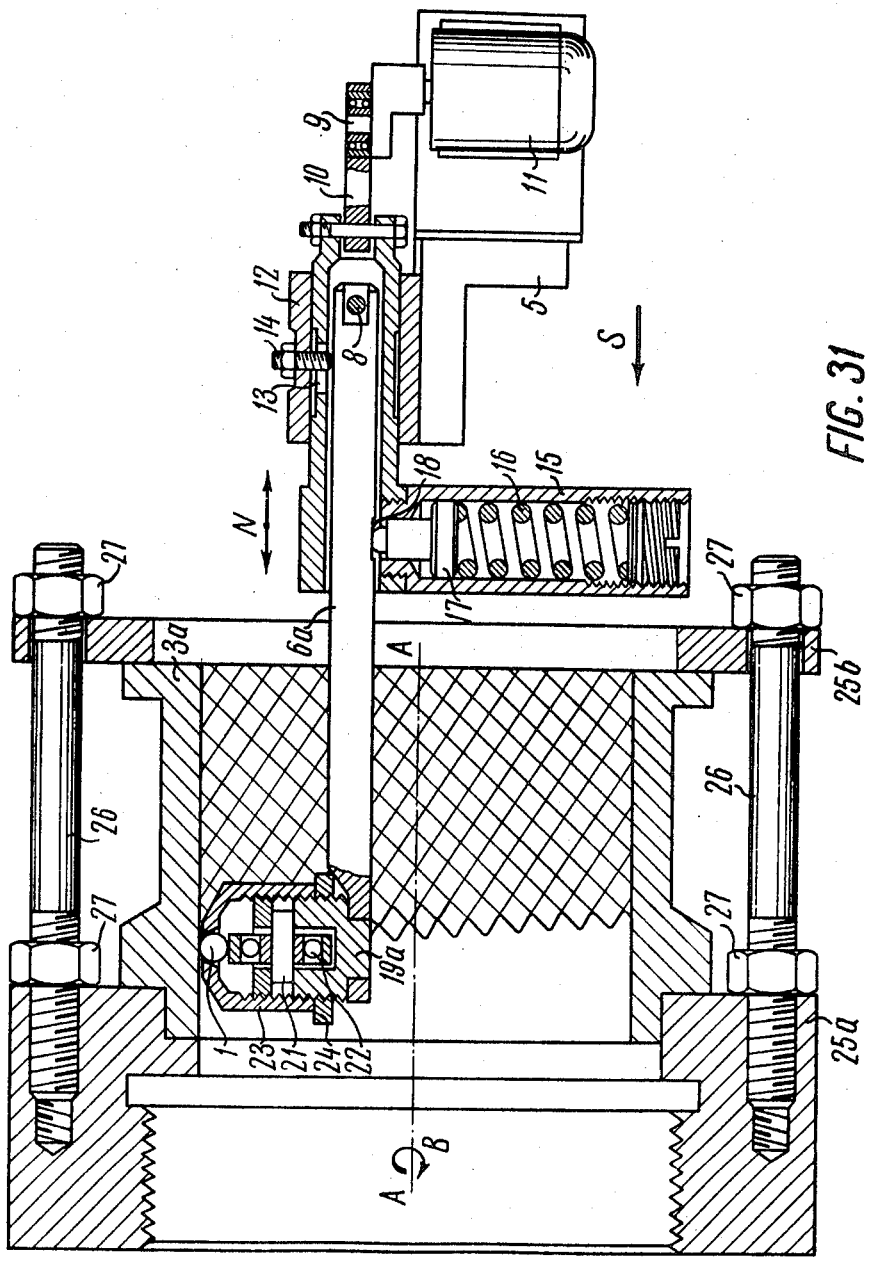
FIG. 31 is a view, partly in section, of a part of the device for the realization of the method illustrated in FIG. 23.

The version of the method illustrated in FIG.23 is realized by the device shown in FIG.31. This device differs from the preceding one in that it is designed for machining the internal cylindrical surfaces of the hollow bodies of rotation. In consequence of this, the holder 6a of the deforming member 1 is a straight rod with a hole near its free end, this hole being threaded and receiving the head 19a. Such a design of the holder and head makes it possible to bring the deforming member close to the longitudinal axis of the holder 6a and, therefore, allows the head 19a to be inserted into the hollow article 3a. The clamps 25a and 25b are made in the form of rings interconnected by studs 26 and nuts 27.

Figure 30:
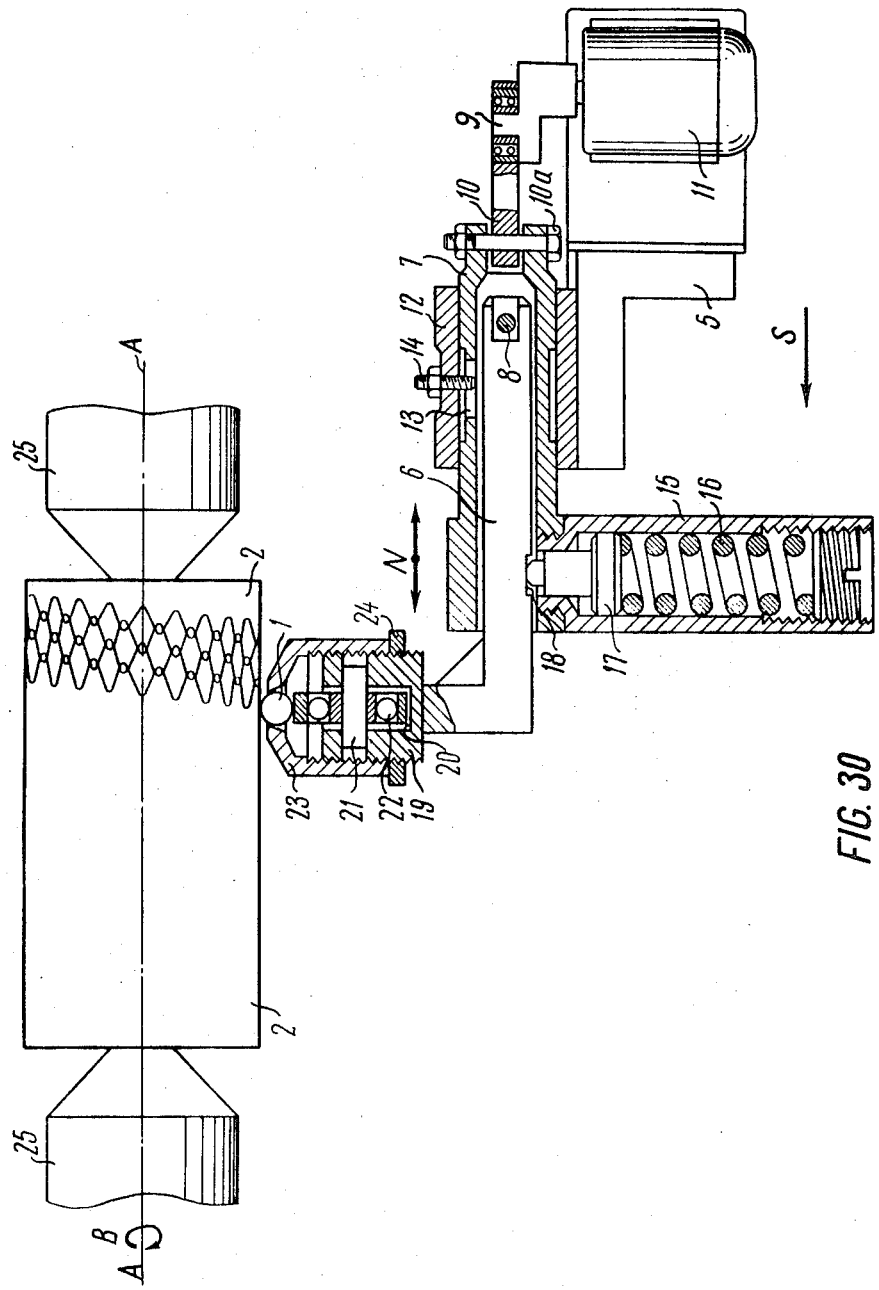
FIG. 30 is a view, partly in section, of the device for the realization of the method illustrated in FIG. 4.

For machining the face surfaces of an article 2 which is a body of revolution it is possible to use the device shown in FIG.30, though the base 5 should be allowed to turn through in this instance 90° and clamping means must be provided which fit around the side surface of the article instead of engaging its end faces so as not to interfere with their machining.

Figure 32:
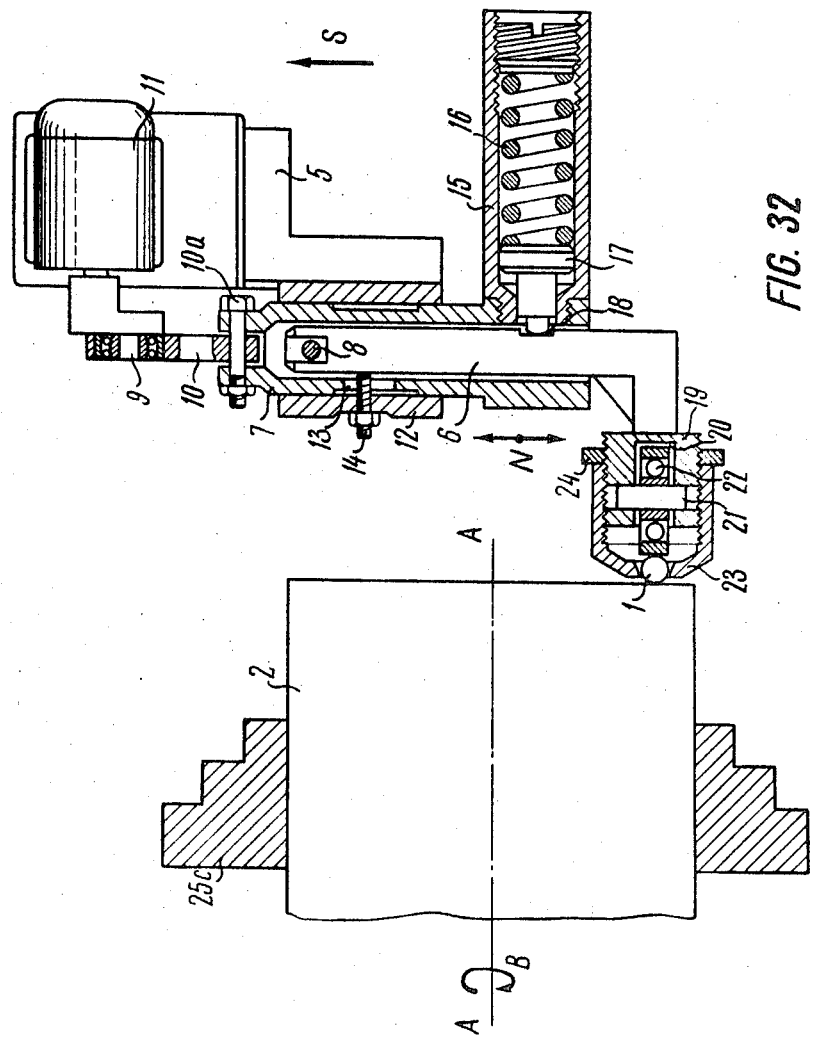
FIG. 32 is a view, partly in section, of a part of the device for the realization of the method illustrated in FIG. 24.

The drive of the base 5 should also be made with a possibility of moving in relatively perpendicular directions. It must be understood that this device is intended only for machining the end faces of the bodies of revolution which corresponds to the version of the method illustrated in FIG.24. In such a case the device is realized as illustrated in FIG.32. The clamp 25c of this device is of the jaw type similar to the chucks of turning lathes.

The above-described devices illustrated in FIGS. 30 through 32 can be mounted on the base of conventional turning lathes by replacing several parts mounted on the conventional tool carrier.

Figure 29:
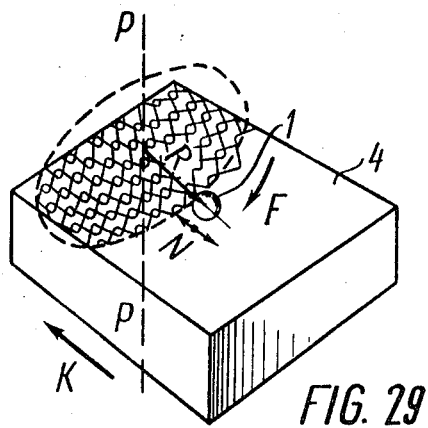
FIG. 29 is an elementary diagram of the motions of the deforming member while grooving a flat surface of an article which is not a body of revolution, and of the motions of said article.
Figure 33:
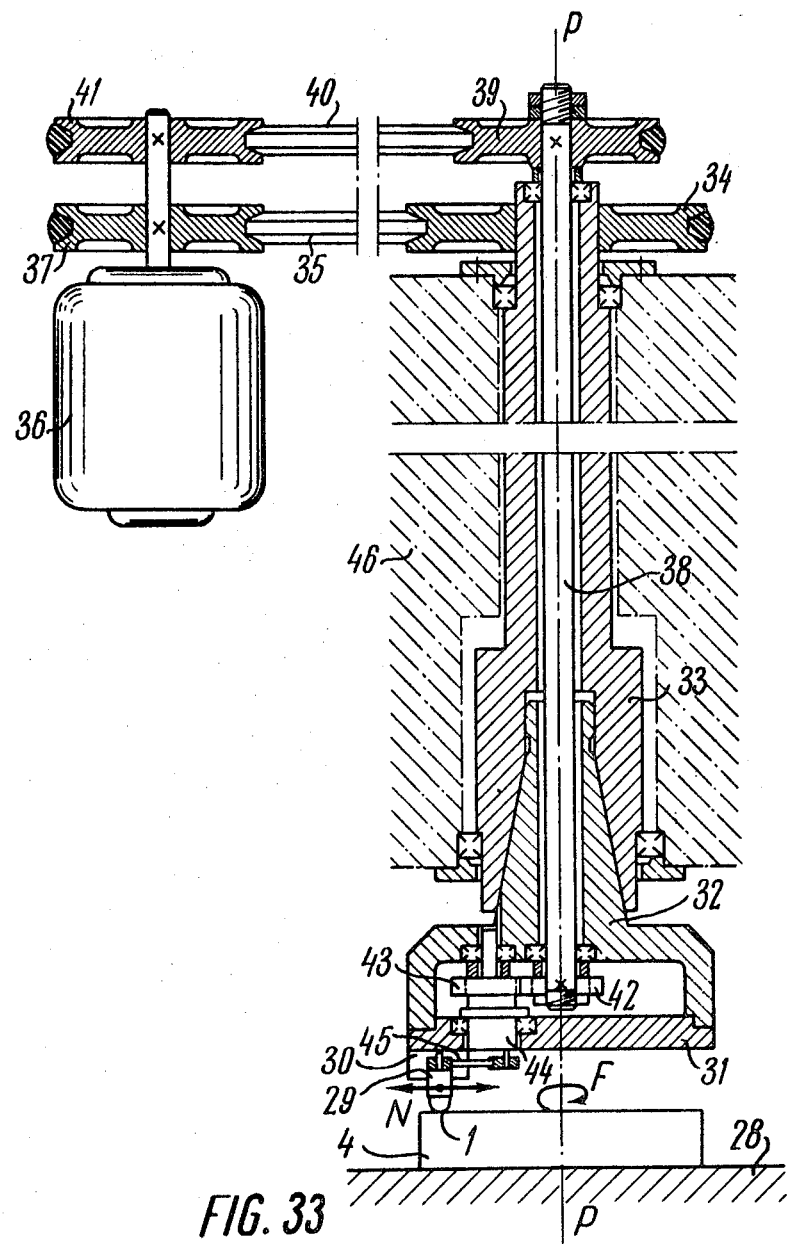
FIG. 33 is a view, partly in section, of the device for the realization of the method illustrated in FIG. 29.

The version of the method illustrated in FIG.29 is realized by the device shown in FIG.33. This device comprises a movable table 28 to which the article 4 is secured. The table moves progressively in the direction perpendicular to the plane of the drawing. This motion is shown in FIG.29 by arrow K. The spring-loaded deforming member 1 (spring not shown) mounted on a slide 29 is forced into the surface layer of the article being machined. The slide 29 is installed in guides 30 (one of such guides being shown) welded to a cover 31 of a rotating base 32, the latter being installed in a hollow spindle 33. Secured to the hollow spindle 33 is a pulley 34 which is driven by an electric motor 36 via a pulley 37 with the aid of a drive belt 35. The hollow spindle 33 accommodates coaxially therein a second spindle 38 on which a pulley 39 is mounted, said pulley also being driven by the electric motor 36 via a pulley 41 with the aid of a drive belt 40. The rotational speed of the spindle 38 is higher than that of the spindle 33. The end of the spindle 38 located in the base 32 carries a gear 42 meshing with a gear 43 which is secured to and forms part of an eccentric 44 with which the slide 29 is connected by a shackle 45, During the rotation of the eccentric 44 the slide 29 reciprocates in the direction shown by arrows N. Simultaneously, the slide 29 rotates around the rotational axis P—P of the spindles 33 and 38 in the direction shown by arrow F. This deice can be realized on the base of a planing machine where a frame 46 accommodating the spindles may be constituted by the conventional cross carriage.

It is obvious that the device can also be made on the base of a vertical milling machine where the frame 46 can be constituted by the angle bracket of the machine.

Figure 34:
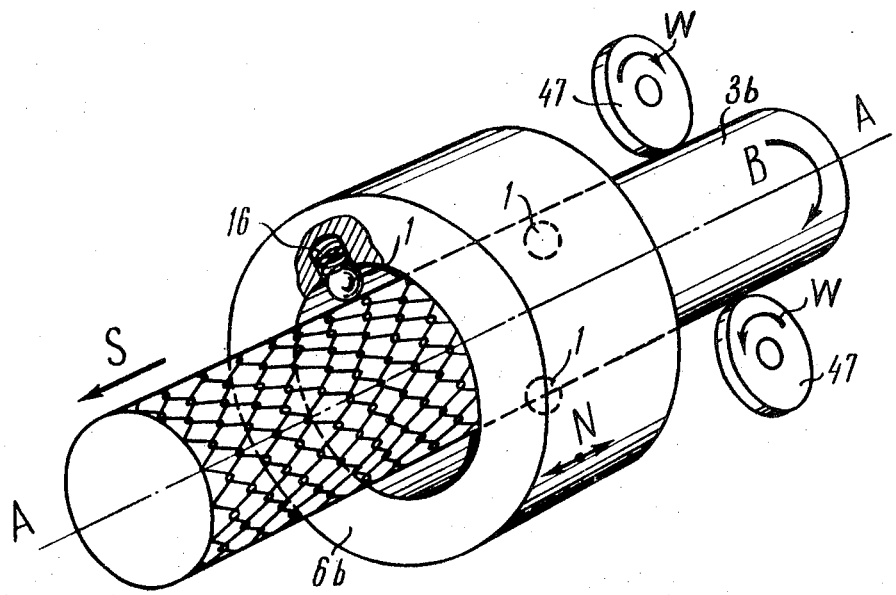
FIG. 34 is a diagrammatical view of a part of the device for grooving the external cylindrical surface of relatively long articles which are bodies of revolution.

The external surfaces of the relatively long bodies of revolution can be machined with the aid of the device shown in FIG. 34. Here the article 3b in the form of a bar or tube is held and rotated, by means of discs 47 positioned at an angle to the longitudinal axis of the tube. When these discs rotate in the directions shown by arrows W, the tube keeps rotating around its longitudinal axis A—A in the direction shown by arrow B and simultaneously moves progressively in the direction of arrow S. The tube 3b passes through the holder 6b of the three deforming members 1 loaded by springs 16 (one such spring being shown). The drive (not shown) reciprocates the holder 6b in the directions shown by arrows N.

The deforming members 1 are preferably angularly spaced by 120° around the axis A—A.

Such a design of the device increases its output considerably.

The article can be rotated and moved along the axis of rotation by any other suitable known device which is capable of ensuring these motions.

By varying the speeds of the drives in all the above-described devices it is possible to change the size of the network mesh formed by the grooves, and its pattern even while machining only one article. This is very important while machining the cylinder liners of I.C. engines and other parts which have surfaces subjected to heavy wear, and also those worn but slightly. It is clear that the heavily worn surfaces should have a network with a finer mesh than the other surfaces.

While machining the decorative articles, uniform or nonuniform diminishing or increasing of the network mesh size will make their appearance more attractive.

What we claim is:

1. A method of grooving the machine surfaces of an article by forcing a spring-loaded spherical deforming member into the surface layer of the article, consisting in imparting to both the article and the deforming member a combination of relative rotary, progressive and reciprocating motions.

2. The method of grooving the curvilinear surfaces of an article which is a body of revolution, according to claim 1, wherein said article is rotated about a rotational axis, while said deforming member is simultaneously imparted two kinds of motion, the first of which is progressive and parallel to the rotational axis of said article and the other is reciprocating motion directed along said axis.

3. The method of grooving the curvilinear surfaces of an article which is a body of revolution according to claim 1, wherein said article is rotated about a rotational axis, while said deforming member is simultaneously imparted two kinds of motion, the first of which is progressive and parallel to the rotational axis of the article and the other is reciprocating motion executed around an axis perpendicular to the rotational axis of the article.

4. The method of grooving the curvilinear surfaces of an article which is a body of revolution, according to claim 1, wherein said article is rotated about a rotational axis, while said deforming member is simultaneously imparted two kinds of motion, the first of which is progressive and parallel to the rotational axis of said article, and the other is rotational and executed around an axis perpendicular to the rotational axis of the article.

5. The method of grooving the curvilinear surfaces of an article which is a body of revolution, according to claim 1, wherein said article is rotated about a rotational axis while said deforming member is simultaneously imparted three kinds of motion, the first of which motions is progressive and parallel to the rotational axis of said article, the second of which is reciprocating having the direction of the progressive motion and the third of which is rotational and executed around an axis perpendicular to the rotational axis of said article.

6. An apparatus for grooving the curvilinear surface of an article which is a body of revolution, by forcing a spring-loaded spherical deforming member into the surface layer of said article, comprising: a holder for said article, connected with a drive which rotates said holder about a rotational axis; a holder for said spring-loaded spherical deforming member mounted on a base which is connected with a drive imparting to said base a progressive motion along the rotational axis of said holder of said article; a drive for said holder of said deforming member, mounted on said base and imparting to said holder a reciprocating motion along the direction of said motion of said base.

7. An apparatus for grooving the end faces of an article which is a body of revolution by forcing a spring-loaded spherical deforming member into the surface layer of said end faces, comprising: a holder for said article, connected with a drive which imparts a rotary motion to said holder about a rotational axis; a holder for said spring-loaded spherical deforming member mounted on a base and connected with a drive imparting to said base a progressive motion across the rotational axis of said holder of said article; a drive for said holder of said deforming member, mounted on said base and imparting a reciprocating motion to said holder along the direction of said motion of said base.

8. An apparatus for grooving the surfaces of an article of any configuration, by forcing a spring-loaded spherical deforming member into the surface layer of said article, comprising: a holder for said article, connected with a drive imparting a straight progressive motion to said holder; a holder for said spring-loaded spherical deforming member mounted on a base and connected with a drive imparting to said base a rotary motion around an axis perpendicular to the direction of said motion of said holder of said article, a drive for said holder of said deforming member mounted on said base and imparting to said holder an oscillatory motion along the radius of a circle along which the periphery of said base is caused to move, said radius intersecting said deforming member.

9. The apparatus according to claim 6, for grooving the external surface of relatively long cylindrical articles, comprising three of said spring-loaded spherical deforming members, each of said members being mounted on the inner side of a holder which is made in the form of a hollow bushing; a drive for said holder of said deforming members, to impart to said holder a reciprocating motion along the longitudinal axis thereof; and means for rotating and displacing said rotating article relative to said holder of said deforming members.

10. The method of grooving the end faces of an article which is a body of revolution, according to claim 1, wherein said article is rotated about a rotational axis, while the deforming member is simultaneously imparted two kinds of motion, the first of which is progressive and perpendicular to the rotational axis of the article and the other of which is reciprocating executed in the direction of the first motion.

11. The method of grooving of articles of any configuration, according to claim 1, wherein said article is imparted a straight progressive motion, while said deforming member is simultaneously imparted two kinds of motion, the first of which is rotational around a fixed axis perpendicular to the direction of the motion of the article and the other of which is reciprocating motion executed along a radius drawn from the fixed axis to the point at which the deforming member is forced into the surface layer of the article.

* * * * *